July 13, 1965 E. A. KIECKER 3,194,578
SWIVEL WHEELED TRAILERS
Filed Nov. 15, 1961
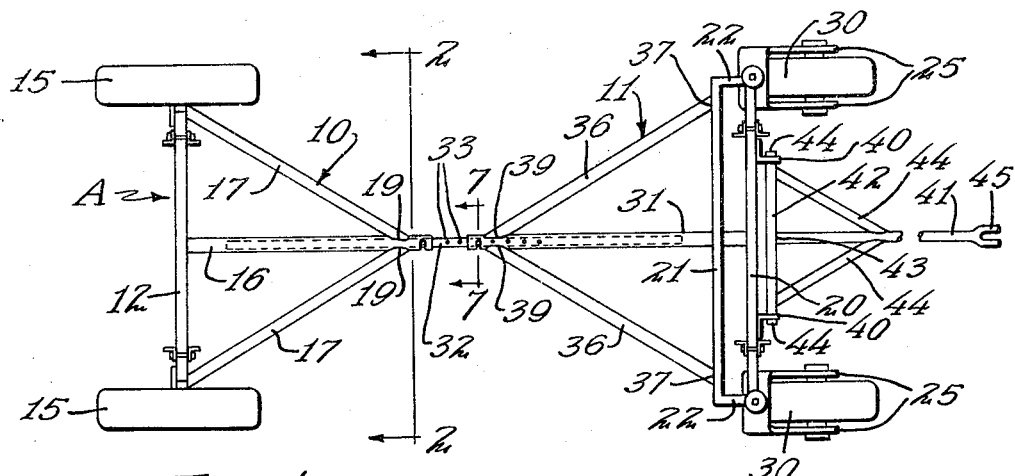
FIG. 1
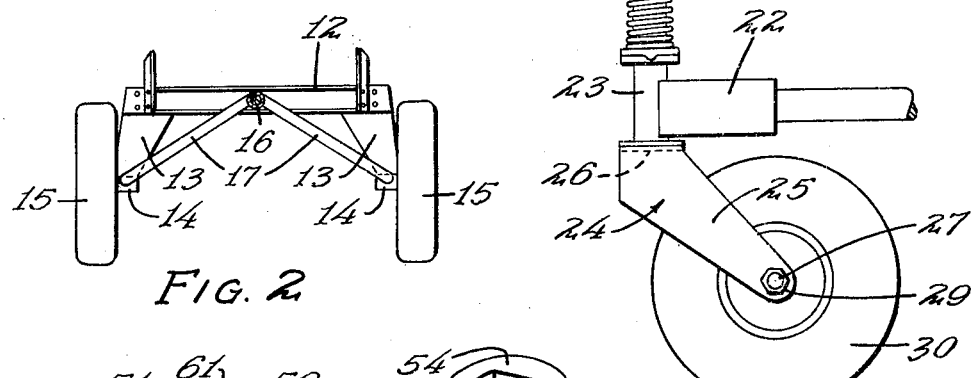
FIG. 2
FIG. 3
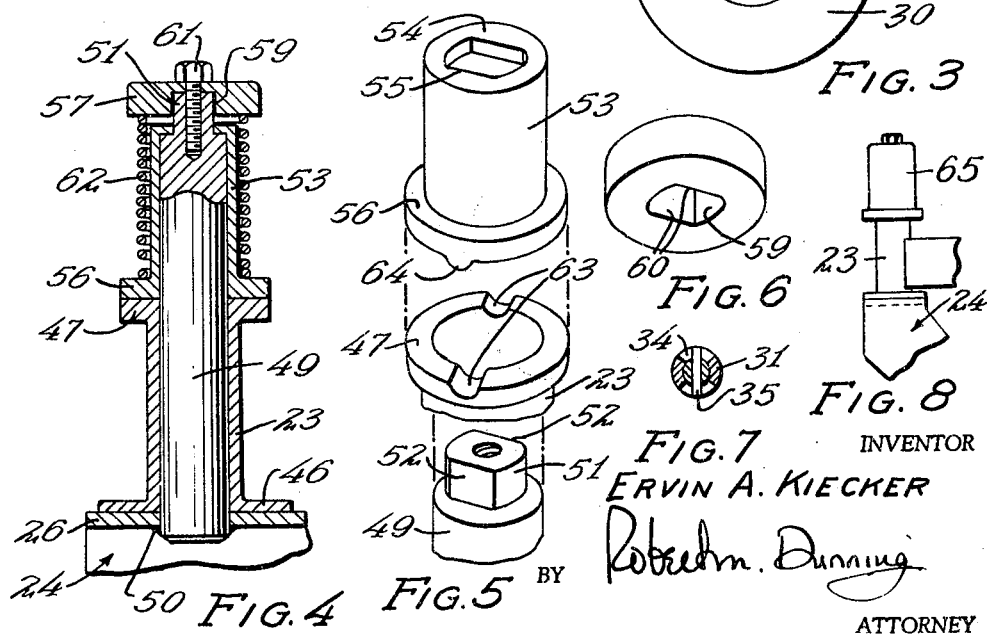
FIG. 4   FIG. 5   FIG. 7   FIG. 6   FIG. 8
INVENTOR
ERVIN A. KIECKER
BY Robert M. Dunning
ATTORNEY 3,194,578
SWIVEL WHEELED TRAILERS
Ervin A. Kiecker, Fairfax, Minn.
Filed Nov. 15, 1961, Ser. No. 152,441
2 Claims. (Cl. 280—80)

This invention relates to an improvement in swivel wheeled trailers and deals particularly with a trailer which is capable of supporting heavy loads and which may be pulled at high speed with a minimum of whipping or weaving.

An object of the present invention resides in the provision of a trailer including forward wheels and rear wheels connected by means of a frame in such a manner that one pair of wheels can swivel about a longitudinal horizontal axis with respect to the others. The trailer is arranged with the rear axle extending transversely of the longitudinal axis of the trailer and which maintains the rear wheels in axial alignment. The front wheels are caster wheels mounted at opposite ends of a transverse frame member and including yokes within which the wheels are pivoted on a horizontal axis and which are provided with vertical pivots supported at opposite ends of the transverse frame member. As a result, the two wheels may swivel about the vertical axis, and as the transverse axis about which the wheels may pivot is offset relative to the axis of the vertical pivot, the yokes together with the wheels supported thereby will swivel when necessary.

An object of the present invention resides in the provision of a trailer of the type described including caster wheels which are pivotally supported to the frame on a vertical axis and which may swing in either direction from planes parallel to the longitudinal axis of the trailer. Means are provided, however, for normally holding the caster wheels parallel to the longitudinal axis of the trailer so that under normal conditions these wheels will function much as though they were mounted upon a common axis. However, when the trailer is backed up or moved at a relatively sharp angle, the caster wheels will rotate about their vertical axis to accomplish the desired result.

These and other objects and novel features of the present invention will be more clearly and fully set forth in the following specification and claims.

In the drawings forming a part of the specification;

FIGURE 1 is a top plan view of the trailer frame, the front caster wheels being turned forwardly as though the tractor were backing up for the pupose of clarity.

FIGURE 2 is a cross secional view through the apparatus, the position of the section being indicated by the line 2—2 of FIGURE 1.

FIGURE 3 is a side elevational view of one of the caster wheels.

FIGURE 4 is a sectional view through one of the caster wheel supports.

FIGURE 5 is an exploded view of certain of the pivot structure illustrated in FIGURE 4.

FIGURE 6 is a bottom perspective view of the top washer at the top of the caster pivot shaft.

FIGURE 7 is a sectional view through the longitudinal frame member, the position of the section being indicated by the line 7—7 of FIGURE 1.

FIGURE 8 is an elevational view of a modified form of cap to enclose the caster wheel pivot.

The swivel wheel trailer A includes a rear frame member 10 and a front frame member indicated in general by the numeral 11. The rear frame member includes a transverse channel 12 to the opposite ends of which are welded or otherwise fixed spaced downwardly projecting plates 13. The plates 13 are provided at their lower ends with aligned bearing sleeves 14 which are designed to accommodate the stub axles of the wheels 15. Thus the rear wheels of the apparatus are supported along aligned pivots and support the wheels 15 in generally parallel relation.

A tubular frame member 16 is secured at one end to the center of the channel 12 to extend at right angles with respect thereto. Braces 17 are connected at their forward ends 19 to the tubular member 16 and are connected at their rear ends to the supporting plates 13 near the axis of the sleeves or bearings 14. Thus the rear wheels 15 are supported on opposite sides of the axial center of the trailer and the braces 17 hold the wheel axle in proper relationship to the frame.

The front frame portion 11 includes a rectangular frame including a transverse forward member 20, a transverse parallel rear member 21, and parallel frame members 22 connecting the ends of the frame members 20 and 21. Vertical bearing sleeves 23 are welded or otherwise secured at the juncture between the front frame member 20 and the connecting end members 22, these sleeves forming pivotal support for the front caster wheels as will be described. The front caster wheels include a generally U-shaped yoke 24 including parallel sides 25 connected by a generally horizontal connecting portion 26. The sides 25 of the yoke extend diagonally from the connecting member 26 and are provided with aligned apertures designed to accommodate the pivot shaft 27 which extends through the lower ends of the yoke sides 25. The pivot shaft 27 is held in place by nuts 29 or other suitable means and act as a pivotal support for a corresponding caster wheel 30. As is evident from FIGURE 3 of the drawings, the axis of the pivot shaft which supports the wheel is substantially offset from vertical alignment with the axis of pivot of the yoke 24.

A tubular frame member 31 which is preferably of the same diameter of the frame member 16 extends through the frame member 21 and is anchored to the forward frame member 20. The frame member 31 extends at right angles to the frame members 20 and 21 and is located centrally thereof to extend along the longitudinal axis of the trailer. The two tubular frame members 16 and 31 are connected by a connecting rod 32 which includes a series of axially spaced diametrically extending apertures 33. As is indicated in FIGURE 7 of the drawings, the tubular members 16 and 31 include opposed angular slots 34 designed to accommodate a connecting pin 35 extending through a selected one of the apertures 33. The slots 34 and the pin 35 act to hold each frame member from axial movement relative to the connecting rod 32, but permit each of the frame members 10 and 11 to pivot about the axis of the connecting member 32 so that the trailer may travel over uneven ground. Braces 36 are welded or otherwise secured at 37 to the rear frame member 21 and are connected at their other ends as indicated at 39 to the tubular member 31 to hold the member 31 in right angular relation to the transverse front frame.

The frame member 20 of the front frame supports a pair of forwardly extending angle members 40 which are equally spaced on opposite sides of the transverse center of the frame. The draw bar 41 is centrally connected to a transverse pivot member 42 at 43. The pivot member 42 is designed to extend between the forwardly extending flanges of the angle members 40, and pivot bolts 44 pivotally connect the pivot member 42 on the transverse axis to the angle members 40. Diagonally extending braces 44 are connected between the draw bar 41 and the pivot member 42 to hold the draw bar in its proper position. The draw bar 41 is provided at its forward end with a trailer hitch 45 by means of which the trailer may be connected to a towing vehicle.

With reference now to FIGURES 4, 5, and 6 of the drawings, it will be noted that each vertical bearing 23 is provided at its lower end with a bearing flange 46 which rests upon the connecting member 26 of the wheel supporting yoke 24. A thrust bearing may be inserted between these two parts if it is so desired. A peripheral flange 47 is also provided at the upper end of the bearing sleeve 23. A pivot pin 49 is welded or otherwise secured at 50 to the connecting portion 26 of the wheel yoke 24 and pivots in combination therewith. The pivot pin 49 extends somewhat above the level of the flange 47 as is best illustrated in FIGURE 4 of the drawings. As is indicated in FIGURE 5, the upper end of the pivot pin 49 includes an axially extending projection 51 having flattened parallel sides 52. A sleeve 53 encircles the upper portion of the pivot pin 49, and is provided with an upper end closure plate 54 having an aperture 55 extending therethrough which is designed to fit upon the projection 51 so that the sleeve 53 is held from rotation relative to the pivot pin 49. A flange 56 is provided at the lower end of the sleeve 53 and is designed to rest upon the flange 47 of the bearing sleeve 23. A cap washer 57 includes a socket 59 in its under surface having flattened sides 60 which also fit about the projection 51 to hold the cap from rotation relative to the pivot pin 49. A connecting bolt 61 extends axially through the cap 57 and into the pivot pin projection 51 to connect these two parts. A spring 62 is interposed between the cap 57 and the flange 56, the spring tending to urge the flange 56 into engagement with the flange 47.

As is indicated in FIGURE 5 of the drawings, the flange 47 on the bearing sleeve 23 is provided with a pair of diametrically opposed notches 63 and the under surface of the flange 56 is provided with a pair of diametrically opposed radially extending rounded projections 64 which are accommodated in the notches 63. The projections 64, when engaged with the notches 63, hold the two caster wheels 30 extending longitudinally, or parallel to the longitudinal axis of the trailer. Thus when the caster wheels 30 are extending forwardly of their pivot 49, as in FIGURE 1 of the drawings, which position the wheels would assume if the trailer were moving rearwardly, or in diametrically opposed relation to the position illustrated in FIGURE 1, as indicated in FIGURE 3 of the drawings, the projections 64 and notches 63 would tend to maintain the caster wheels on planes parallel to the longitudinal axis of the trailer.

When the trailer is being maneuvered around sharp corners, the caster wheels 30 will rotate about the axis of the pivot shafts 49 connecting the caster wheels to the bearings 23. However, when the trailer is being drawn along the highway at a relatively high speed, the curves in the highway are of sufficiently large radius so that all four wheels of the trailer may extend on planes generally parallel to the longitudinal axis of the trailer and the trailer will not weave back and forth in a lateral direction as it is towed. If the trailer is drawn along a curve which tends to create lateral slippage of the forward caster wheels, the spring 62 will compress and permit the caster wheels to pivot about their vertical axis to properly follow the curve. As a result, the trailer may be drawn along the highway with extreme effectiveness either at low or high speeds, and the spring force tending to hold the wheels parallel to the longitudinal axis of the trailer also assists in tending to prevent the trailer from jack-knifing when the trailer is pushed in a rearward direction.

If the means for holding the caster wheels aligned with the direction of movement is not desired, the sleeves 53, springs 62 and cap washer 57 are replaced with a cylindrical cap 65 held in place by the bolt 61. Alternatively, the trailers may be supplied equipped with caps such as 65 and later replaced by the sleeves 53, springs 62 and washer 57.

In accordance with the patent statutes, I have described the principles of construction and operation of my improvement in "Swivel Wheeled Trailers," and while I have endeavored to set forth the best embodiment thereof, I desire to have it understood that changes may be made within the scope of the following claims without departing from the spirit of my invention.

I claim:
1. A trailer including:
 (a) an elongated frame,
 (b) a pair of rear wheels,
 (c) means supporting said rear wheels on axially aligned transverse pivots on said frame,
 (d) a pair of caster wheels supporting the weight of the trailer and transversely pivotal about generally parallel vertical axes disposed on opposite transverse ends of said front frame member,
 (e) an elongated, generally cylindrical bearing having a vertical axis stationarily secured to each end of said front frame member,
 (f) said caster wheels including a wheel supporting member and having a pivot shaft extending through said bearng,
 (g) said bearing encircling said pivot shaft from the end of said shaft adjacent said wheels to a point intermediate the other end of said shaft,
 (h) a flange at the upper end of said bearing,
 (i) an elongated sleeve encircling said pivot shaft and including a friction flange at one end in abutting relation to said flange on said bearing,
 (j) said sleeve having its other end fixedly secured in non-rotation relative to said pivot shaft, said sleeve thereby being held from rotation relative to said shaft,
 (k) said sleeve slidably supported on said shaft,
 (l) abutment means on said shaft above said sleeve whereby upward slidable movement of said sleeve is restricted,
 (m) spring means interposed between said abutment means and said friction flange to urge said friction flange toward said flange on said bearing,
 (n) whereby frictional engagement between said abutting flanges is maintained to resist turning of said wheels.

2. The structure of claim 1 and in which the surfaces of said flanges in abutting relation include interengaging means operable to restrain said flanges from relative rotation.

References Cited by the Examiner

UNITED STATES PATENTS

| | | | |
|---|---|---|---|
| Re. 23,459 | 2/56 | Budnick | 280 |
| 1,647,034 | 10/27 | Chase | 280—92 |
| 1,968,046 | 7/34 | Linn. | |
| 2,192,282 | 3/40 | Warner. | |
| 2,350,624 | 6/44 | McDaniel. | |
| 2,709,829 | 6/55 | Marvin | 280—78 X |
| 2,761,692 | 9/56 | Sisulak | 280—63 X |
| 2,766,052 | 10/56 | Nash | 180—111 |
| 2,808,269 | 10/57 | Cathey | 280—93 |

A. HARRY LEVY, *Primary Examiner.*

LEO FRIAGLIA, *Examiner.*